(12) United States Patent
Matteo et al.

(10) Patent No.: US 8,675,861 B2
(45) Date of Patent: Mar. 18, 2014

(54) METHODS AND APPARATUS FOR VARIABLE WAIT TREATMENTS FOR REQUESTS ENQUEUED IN ONE OR MORE QUEUES

(75) Inventors: Peter Matteo, Eatontown, NJ (US); Balaji Patakula, Parlin, NJ (US); Sami Qutub, Freehold, NJ (US); Rafal Sitkowski, Old Bridge, NJ (US); David Sokoler, Colts Neck, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1109 days.

(21) Appl. No.: 11/453,273

(22) Filed: Jun. 14, 2006

(65) Prior Publication Data

US 2007/0291922 A1 Dec. 20, 2007

(51) Int. Cl.
*H04M 3/00* (2006.01)
*H04M 5/00* (2006.01)

(52) U.S. Cl.
USPC .............................. 379/266.06; 379/265.02

(58) Field of Classification Search
USPC .................. 379/265.02, 266.01–266.08, 379/265.01–265.14, 72, 67.1, 309
See application file for complete search history.

(56) References Cited

U.S. PATENT DOCUMENTS

| | | | |
|---|---|---|---|
| 5,506,898 A * | 4/1996 | Costantini et al. ....... 379/266.06 | |
| 5,740,238 A | 4/1998 | Flockhart et al. | |
| 5,754,639 A | 5/1998 | Flockhart et al. | |
| 6,049,547 A | 4/2000 | Fisher et al. | |
| 6,295,353 B1 | 9/2001 | Flockhart et al. | |
| 6,678,371 B1 | 1/2004 | Flockhart et al. | |
| 6,714,643 B1 * | 3/2004 | Gargeya et al. ........... 379/266.06 | |
| 6,839,419 B1 | 1/2005 | Flockhart et al. | |
| 2005/0069102 A1 * | 3/2005 | Chang ......................... 379/88.18 | |
| 2005/0129187 A1 * | 6/2005 | Agapi et al. ..................... 379/76 | |
| 2005/0147228 A1 * | 7/2005 | Perrella et al. ........... 379/265.06 | |
| 2005/0195961 A1 * | 9/2005 | Pasquale et al. ......... 379/265.02 | |
| 2007/0211879 A1 * | 9/2007 | Shaffer et al. ............ 379/265.01 | |

* cited by examiner

*Primary Examiner* — Oleg Asanbayev
(74) *Attorney, Agent, or Firm* — Anderson Gorecki & Rouille LLP

(57) ABSTRACT

Methods and apparatus are provided for variable wait treatments for requests enqueued in one or more queues. A request in a resource allocation system is processed by assigning the request to a queue and selecting a wait treatment for the request based on one or more characteristics of the queue. The characteristics may include, for example, a predicted wait time for servicing the request. A request in a resource allocation system is processed by assigning the request to a queue; determining a predicted wait time for servicing the request; selecting a wait treatment for the request based on one or more characteristics of the queue; transferring the request to an announcement server for a transfer duration for presentation of the selected wait treatment; and reassessing the predicted wait time upon completion of the transfer duration. The request can be assigned to an available resource based on the reassessed predicted wait time.

12 Claims, 3 Drawing Sheets

US 8,675,861 B2

METHODS AND APPARATUS FOR VARIABLE WAIT TREATMENTS FOR REQUESTS ENQUEUED IN ONE OR MORE QUEUES

FIELD OF THE INVENTION

The present invention relates generally to automatic call distribution (ACD) techniques, and more particularly, to methods and apparatus for playing announcements and other wait treatments to requests enqueued in one or more queues.

BACKGROUND OF THE INVENTION

For many enterprise applications, finite resources must be allocated among a number of requests for such resources. In an enterprise call center, for example, incoming calls must often be routed to an appropriate call center agent at one or more local or remote call centers. Incoming calls are generally distributed among a number of agents within the call center who are each trained to handle certain types of incoming calls. A call center will normally be capable of handling many different types of received calls. For example, a call center may receive calls relating to each of a multitude of different products and/or services offered by the corresponding enterprise. The services and functions handled by a call center may include taking product orders, providing customer service, providing pricing and/or availability information, or a number of other functions. The types of calls that are supported by a call center are commonly referred to as the "skills" of the call center.

Typically, the number of agents available to service incoming requests is insufficient to meet the demand. Thus, each skill typically has an associated queue for storing received calls until an appropriate agent is available to process the call. Generally, resource allocation systems attempt to balance the work load among the qualified resources that are available. Thus, in the context of a call center, a resource allocation system typically attempts to allocate an available agent based on the service level targets associated with the queues that the agent is qualified to service.

An enterprise will typically define business rules that specify how requests should be treated while waiting in a queue, often referred to as a "wait treatment." For example, the caller may be offered a menu of options that allow the caller to "self service" his or her request. In addition, one or more announcements may be presented to the caller that may contain, for example, account information, transaction history, or promotional messages. Typically, a uniform wait treatment is applied to all requests in a given queue. In a further variation, a customized wait treatment can be provided based on characteristics of the call, such as the nature of the inquiry or a customer assessment, such as whether the customer is a "gold" customer.

In order to provide callers with an improved experience while on hold, a number of call centers transfer the call to an interactive voice response (IVR) unit while the call is on hold for the predicted wait time. Such IVR systems can offer callers a number of different wait treatments. The automatic call distribution (ACD) system, however, loses control of the call for the predicted wait time while the call resides with the IVR system. Thus, the ACD system cannot control the routing of the call during this interval, for example, if an agent becomes available earlier than the predicted wait time.

A need therefore exists for methods and apparatus for providing variable wait treatments based on characteristics of the queue. A further need exists for methods and apparatus for providing wait treatments to a caller using an IVR system or announcement server, without losing control of the call.

SUMMARY OF THE INVENTION

Generally, methods and apparatus are provided for variable wait treatments for requests enqueued in one or more queues. According to one aspect of the invention, a request in a resource allocation system is processed by assigning the request to a queue and selecting a wait treatment for the request based on one or more characteristics of the queue. The characteristics may include, for example, a predicted wait time for servicing the request. The request can optionally be transferred to an announcement server for presentation of the selected wait treatment, such as an announcement or menu of options for presentation to a person associated with the request.

According to another aspect of the invention, a request in a resource allocation system is processed by assigning the request to a queue; determining a predicted wait time for servicing the request; selecting a wait treatment for the request based on one or more characteristics of the queue; transferring the request to an announcement server for a transfer duration for presentation of the selected wait treatment; and reassessing the predicted wait time upon completion of the transfer duration. The request can be assigned to an available resource based on the reassessed predicted wait time. A new wait treatment can be selected for the request based on the reassessed predicted wait time.

A more complete understanding of the present invention, as well as further features and advantages of the present invention, will be obtained by reference to the following detailed description and drawings.

DETAILED DESCRIPTION

The present invention provides methods and apparatus for variable wait treatments based on characteristics of the queue, such as the expected wait time of the call. According to a further aspect of the invention, wait treatments are provided to a caller using an IVR system or an announcement server, without losing control of the call.

While the invention is generally illustrated in conjunction with the processing of calls in an exemplary call center, the invention is not limited to use with any particular type of call center or communication processing application. For example, the invention is applicable to the processing of both incoming and outgoing communications. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks or Internet Protocol (IP) networks. The term "call center" as used herein is thus intended to include any type of ACD system, telemarketing system or other communication system that processes calls or other service requests, including voice calls, video calls, multimedia calls, e-mail, faxes, text chat or voice messages as well as various portions or combinations of these and other types of communications. The term "call" as used herein is intended to include any of the above-noted types of communications as well as portions or combinations of these and other communications.

Figure 1:
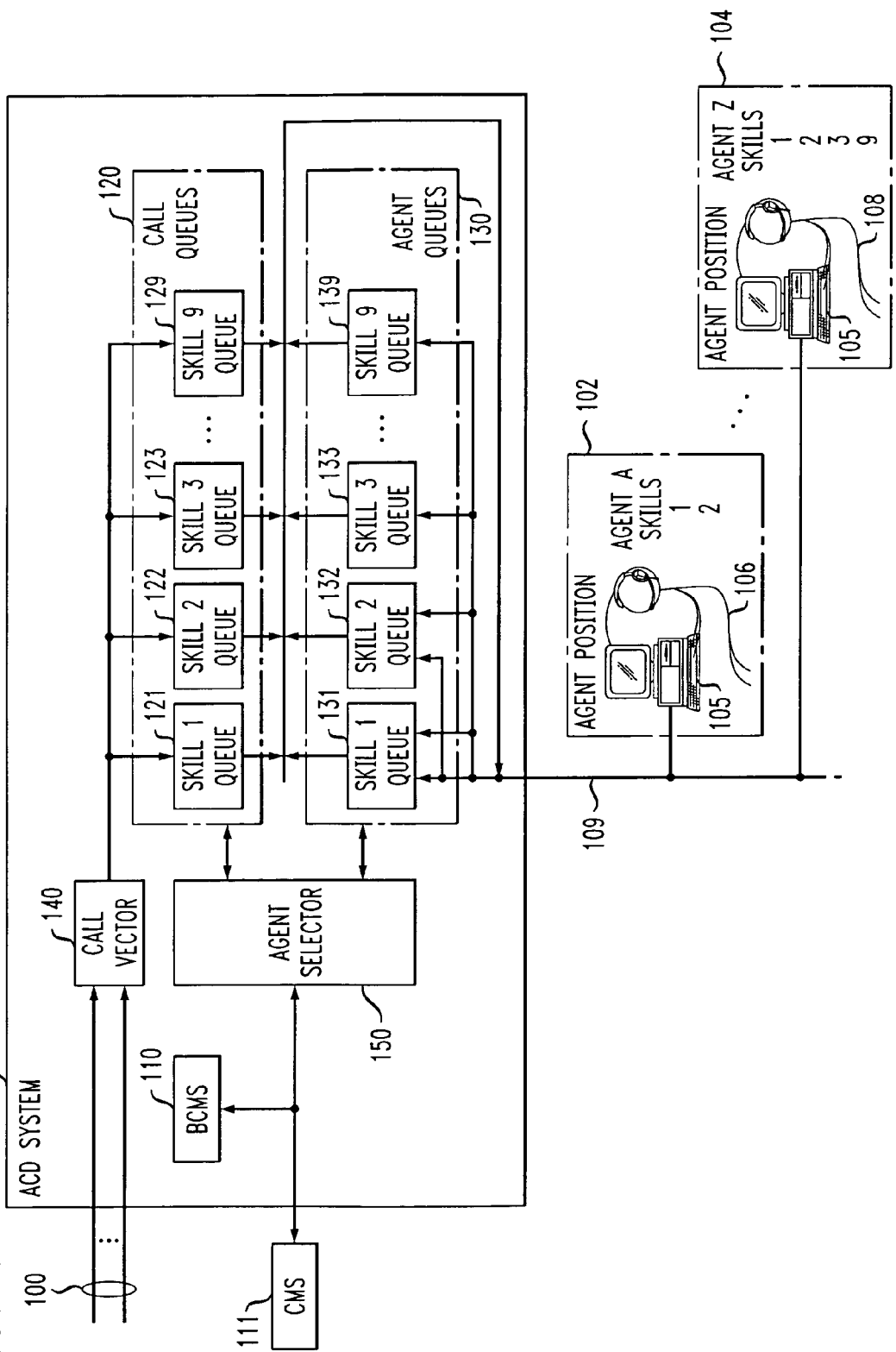
FIG. 1 shows an illustrative call center in which the present invention may be implemented.

FIG. 1 shows an illustrative call center in which the present invention may be implemented. The call center includes a number of telephone lines and/or trunks 100 selectively interconnected with a plurality of agent positions 102-104 via an ACD system 101. Each agent position 102-104 includes a voice-and-data terminal 105 for use by a corresponding agent 106-108 to handle calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

Figure 2:
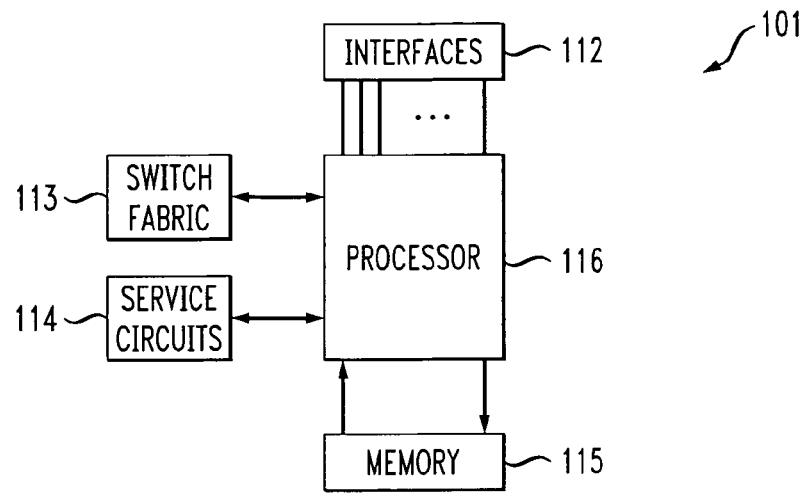
FIG. 2 shows a simplified block diagram of one possible implementation of the automatic call distribution system of FIG. 1.

The ACD system 101 may be implemented in a manner similar to, for example, the Avaya Communication Manager™ from Avaya Inc. of Basking Ridge, N.J. or the Definity™ PBX-based ACD system from Lucent Technologies. FIG. 2 shows a simplified block diagram of one possible implementation of the ACD system 101. The system 101 as shown in FIG. 2 is a stored-program-controlled system that includes interfaces 112 to external communication links, a communications switching fabric 113, service circuits 114 (e.g., tone generators and announcement circuits), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage of e-mails, faxes and other communications.

Referring again to FIG. 1, exemplary data elements stored in the memory 115 of ACD system 101 include a set of call queues 120 and a set of agent queues 130. Each call queue 121-129 in the set of call queues 120 corresponds to a different agent skill, as does each agent queue 131-139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Each queue may have an assigned service level target. As discussed hereinafter, when a resource becomes available, the performance levels of the queues are evaluated relative to the service level targets defined for each queue. Thereafter, the available resource is assigned to service the request from one queue 120.

Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121-129 based upon the agent skill that they require for proper handling. Agents 106-108 who are available for handling calls are assigned to agent queues 131-139 based upon the skills which they possess. An agent may have multiple skills, and hence may be assigned to multiple agent queues 131-139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131-139 at different expertise levels.

Call vectoring is described in greater detail in Definity™ Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is incorporated by reference herein.

Another program executing in ACD system 101 is an agent selector 150. Selector 150 may be implemented in software stored either in the memory 115 of system 101, in a peripheral memory (e.g., a disk or CD-ROM) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793 in the name of inventors A. D. Flockhart et al. and entitled "Waiting-Call Selection Based on Anticipated Wait Times," and U.S. Pat. No. 6,192,122, in the name of inventors A. D. Flockhart et al. and entitled "Call Center Agent Selection that Optimizes Call Wait Times," both of which are incorporated by reference herein.

The call center of FIG. 1 can be configured to apply predictive resource allocation techniques to the queues 120. For a more detailed discussion of queue management techniques, see, for example, U.S. Pat. Nos. 5,206,903 and 6,636,598, each incorporated by reference herein.

Figure 3:
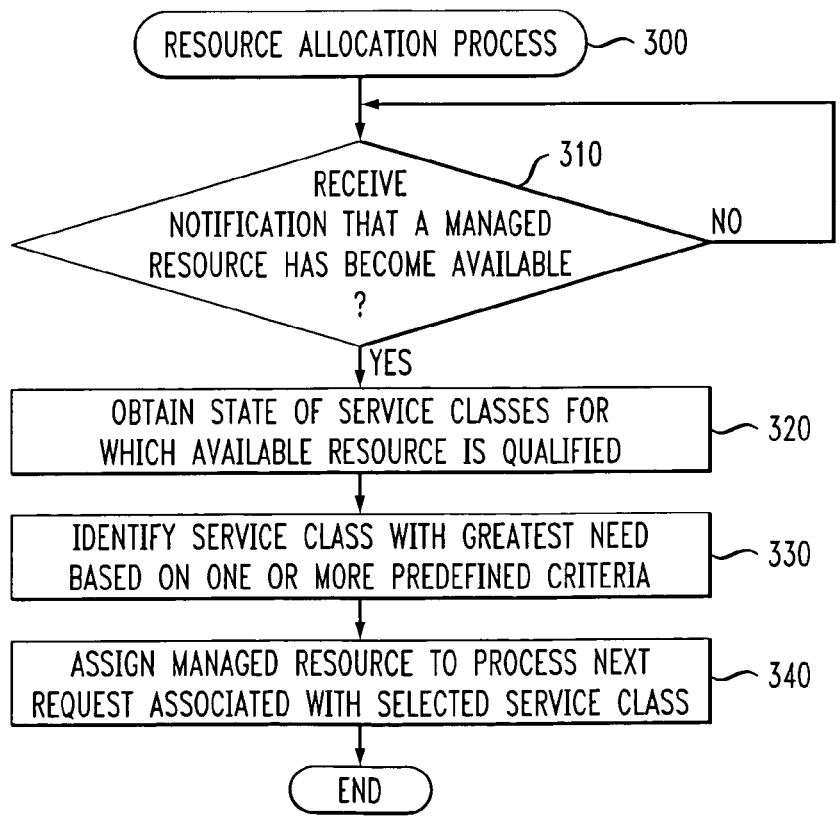
FIG. 3 is a flow chart describing an exemplary implementation of a resource allocation process.

FIG. 3 is a flow chart describing an exemplary implementation of a resource allocation process 300. As shown in FIG. 3, the exemplary resource allocation process 300 is initiated during step 310 upon a notification that a managed resource has become available. For example, in an exemplary call center implementation, an agent may become available upon the successful completion of a prior call.

Once it is determined during step 310 that a managed resource has become available, the available managed resource is matched with a request during steps 320 through 340. After a resource becomes available, the exemplary resource allocation process 300 obtains the state of the service classes for which the managed resource is qualified (i.e., capable) during step 320. The state of service classes may be obtained, for example, using a publish/subscribe mechanism and may be cached by each resource manager.

In one exemplary embodiment, each service class can progress through multiple states. Each state indicates that the service class is in greater need than the previous state. For example, each state indicates how close the service class is to exceeding its target or how much the service class has progressed beyond its target. It is noted that the "greatest need" generally does not mean that the customer is in the greatest need to speak to an agent. The "greatest need" is based on one or more predefined criteria for selecting which queue 120 should be chosen to meet or preserve goals for customer service and to give customers the desired level of service.

In one exemplary embodiment, one of the following five service class states can be assigned to a queue 120 to indicate the current performance level: over served, within range, future jeopardy, current jeopardy, over threshold. For example, the following table shows the service class states for each of the exemplary call queues 120 shown in FIG. 1:

| Queue No. | Current Service Class State |
|---|---|
| Queue 1 | Within Range |
| Queue 2 | Within Range |
| Queue 3 | Over Threshold |
| Queue 4 | Over Served |
| Queue 5 | Over Threshold |
| Queue 6 | Within Range |
| Queue 7 | Current Jeopardy |
| Queue 8 | Future Jeopardy |
| Queue 9 | Within Range |

The service class with the greatest need is identified during step 330 based on one or more predefined criteria. In one exemplary implementation, when multiple service classes are in a state that indicates the greatest need, the resource allocation process 300 prioritizes the assignment of requests to local resources. If the service classes in greatest need include at least one local service class, a local service class is selected. If no local service classes are in greatest need, a remote service class with the greatest need is selected. If two or more remote service classes are in the same state, services classes are selected, for example, based on a round-robin technique, selecting the remote service class with the oldest time stamp. The logical resource manager optionally applies a time stamp to a remote service class when an agent offered for that service class has been accepted.

Once the service class with the greatest need is selected during step 330, the managed resource is assigned during step 340 to process the next request associated with the selected service class. For example, if the service class with the greatest need is a local service class, the request can be obtained from the associated queue 120. If, however, the service class with the greatest need is a remote service class, then the resource can be offered to a remote resource manager, to be matched to work queued at the remote service class.

It is noted that the matching of requests to managed resources can be restricted to resources in a specific location or region, for example, by adding a location qualifier to the service classes. The location qualifier can apply to only one site, or to a region (group of sites). The location qualifier restricts contacts in the service class to be delivered only to that location. For example, a location qualifier can ensure that email contacts received in given country are only handled by agents in the same country.

As indicated above, a call center agent can have one or more capability sets. Each capability set should include the same qualifiers as a service class that the agent can handle. The capability sets are used to match a contact with the agent. If the qualifiers in a capability set match the qualifiers in the service class for a contact, the resource allocation process 300 matches the contact to the agent.

Figure 4:
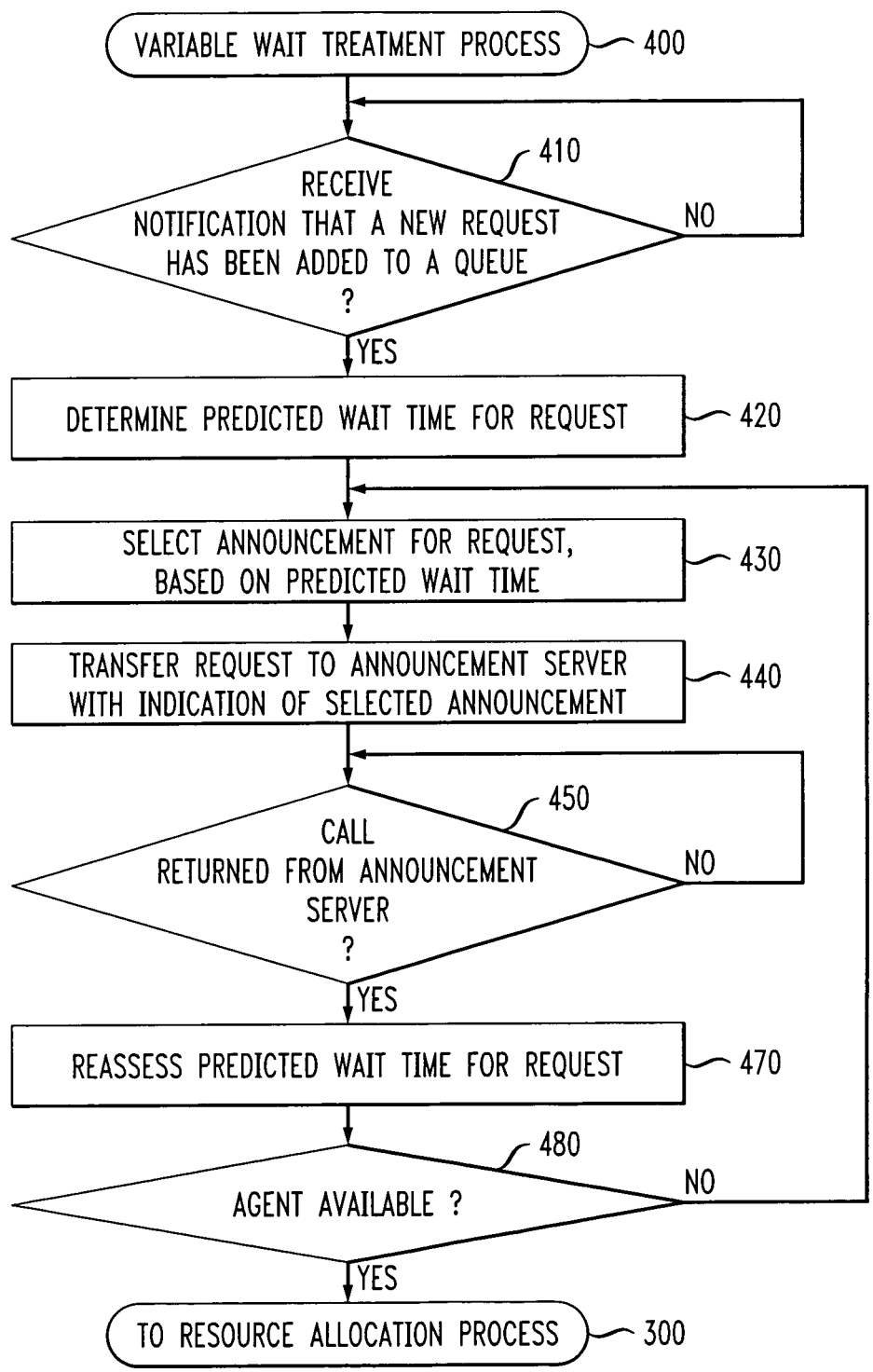
FIG. 4 is a flow chart describing an exemplary implementation of a variable wait treatment process incorporating features of the present invention.

FIG. 4 is a flow chart describing an exemplary implementation of a variable wait treatment process 400. As shown in FIG. 4, the variable wait treatment process 400 is initiated during step 410 upon the addition of a new request into a queue.

Once a new request is added to a queue, the predicted wait time is determined for the request during step 420. An announcement is selected for request during step 430, based on the predicted wait time or other characteristics of the queue. For example, if the wait time is only five minutes, a brief announcement can be selected that provides summary account and transaction information. If the wait time is 30 minutes, however, a longer announcement can be selected that provides more detailed information. The request is then transferred to an announcement server during step 440 with an indication of the selected announcement. In this manner, the ACD system has the flexibility to hand off the announcement to another server yet only loses control of the call for the duration of the selected announcement.

A test is performed during step 450 to determine if the call is returned from the announcement server. Generally, the call is automatically returned from the announcement server upon completion of the announcement that was selected during step 430.

When the call is returned, the predicted wait time for the request is reassessed during step 470. A test is then performed during step 480 to determine if an agent is available to service the request. If an agent is available, then program control proceeds to the resource allocation process 300 and continues in the manner described above. If, however, an agent is not available, then program control returns to step 430 for selection of a new announcement (or another wait treatment) based on the recalculated wait time.

While FIGS. 3 and 4 show an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain using digital logic blocks or in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for processing a request in a resource allocation system, comprising:
    receiving at an ACD system a request for a managed resource;
    matching said request to an available managed resource;
    identifying a service class of said available managed resource and a state of said service class; said state of said service class indicating how close said service class is to exceed a target or how much said service class progressed beyond said target, said state of said service class consisting of over served, within range, future jeopardy, current jeopardy and over threshold;
    assigning one of said state of said service class to a queue to indicate a current performance level of said queue;
    identifying said state of said service class with a greatest need based on one or more predefined criteria;
    assigning said request to a queue having said identified state of said service class;
    selecting a particular wait treatment from a plurality of wait treatments for said request based on one or more characteristics of said queue, wherein said one or more characteristics comprise a predicted wait time for servicing said request;
    determining a predicted wait time for servicing said request, wherein each of said plurality of wait treatments provide a different wait treatment depending on said predicted wait time for servicing said request wherein said different wait treatment includes providing a brief announcement providing summary account and transaction information when said predicted wait time is less than a first predetermined value, and wherein said wait treatment further comprises providing more detailed information when said predicted wait time is greater than a second predetermined value;
    transferring said request to an announcement server for a transfer duration, said request containing an indication of a selected announcement and allowing said ACD system to hand off said announcement to another server while only losing control of said request for said transfer duration for presentation of said selected wait treatment, performing a first test by said ACD system to determining whether said request is returned from said announcement server, and when said request is returned from said announcement server:
    reassessing said predicted wait time upon completion of said transfer duration and performing a second test by said ACD system to determine whether said managed resource is currently available or not currently available to service said request, in response to said determining that said managed resource is currently available, connecting said request to said managed resource; and
    in response to said determining that said managed resource is not currently available selecting a new wait treatment for said request based on said reassessed predicted wait time and transferring said request to said announcement server for a new transfer duration, said request contain a new indication of a selected new announcement, and repeating until said managed resource becomes available.

2. The method of claim 1, wherein said wait treatment comprises an announcement for presentation to a person associated with said request.

3. The method of claim 1, wherein said wait treatment comprises a menu of options for presentation to a person associated with said request.

4. The method of claim 1, wherein said request is assigned to a queue associated with a given service class.

5. The method of claim 1, wherein said request is a call to a call center.

6. The method of claim 1 wherein said transfer duration is less than said predicted wait time.

7. An apparatus for processing a request in a resource allocation system, comprising:
    a memory; and
    at least one processor, coupled to said memory, operative to:
    receiving at an ACD system a request for a managed resource;
    matching said request to an available managed resource;
    identifying a service class of said available managed resource and a state of said service class; said state of said service class indicating how close said service class is to exceed a target or how much said service class progressed beyond said target, said state of said service class consisting of over served, within range, future jeopardy, current jeopardy and over threshold;
    assigning one of said state of said service class to a queue to indicate a current performance level of said queue;
    identifying said state of said service class with a greatest need based on one or more predefined criteria;

assigning said request to a queue having said identified state of said service class;

select a particular wait treatment from a plurality of wait treatments for said request based on one or more characteristics of said queue, wherein said one or more characteristics comprise a predicted wait time for servicing said request;

determine a predicted wait time for servicing said request, wherein each of said plurality of wait treatments provide a different wait treatment depending on said predicted wait time for servicing said request, wherein said different wait treatment includes providing a brief announcement providing summary account and transaction information when said predicted wait time is less than a first predetermined value, and wherein said wait treatment further comprises providing more detailed information when said predicted wait time is greater than a second predetermined value;

transferring said request to an announcement server for a transfer duration, said request containing an indication of a selected announcement and allowing said ACD system to hand off said announcement to another server while only losing control of said request for said transfer duration for presentation of said selected wait treatment, performing a first test by said ACD system to determining whether said request is returned from said announcement server, and when said request is returned from said announcement server:

reassessing said predicted wait time upon completion of said transfer duration and performing a second test by said ACD system to determine whether said managed resource is currently available or not currently available to service said request, in response to said determining that said managed resource is currently available, connecting said request to said managed resource; and in response to said determining that said managed resource is not currently available selecting a new wait treatment for said request based on said reassessed predicted wait time and transferring said request to said announcement server for a new transfer duration, said request containing a new indication of a selected new announcement, and repeating until said managed resource becomes available.

8. The apparatus of claim 7, wherein said wait treatment comprises an announcement for presentation to a person associated with said request.

9. The apparatus of claim 7, wherein said wait treatment comprises a menu of options for presentation to a person associated with said request.

10. The apparatus of claim 7, wherein said request is assigned to a queue associated with a given service class.

11. The apparatus of claim 7, wherein said request is a call to a call center.

12. The apparatus of claim 7 wherein said transfer duration is less than said predicted wait time.

\* \* \* \* \*